United States Patent [19]

Krauss et al.

[11] Patent Number: 5,369,696
[45] Date of Patent: Nov. 29, 1994

[54] INTRASWITCH TRANSITION TO NEW LINE SUPPORT EQUIPMENT

[75] Inventors: William J. Krauss, Elgin; Thomas J. Pieper, Warrenville; Bernard G. Ruel, Naperville; Gilbert M. Stewart, Naperville; Kathleen C. Whildin, Sugar Grove, all of Ill.

[73] Assignee: AT&T Corp., Murray Hill, N.J.

[21] Appl. No.: 890,904

[22] Filed: May 29, 1992

[51] Int. Cl.$^5$ .............................................. H04M 7/00
[52] U.S. Cl. ..................................... 379/268; 379/279; 379/269
[58] Field of Search ................. 379/269, 268, 10, 279; 370/13

[56] References Cited

U.S. PATENT DOCUMENTS

| | | | |
|---|---|---|---|
| 4,653,043 | 3/1987 | Brady | 370/13 |
| 5,105,420 | 4/1992 | Ardon | 379/269 |
| 5,187,733 | 2/1993 | Beffel | 379/10 |

*Primary Examiner*—James L. Dwyer
*Assistant Examiner*—Michael N. Lau
*Attorney, Agent, or Firm*—Charles L. Warren

[57] ABSTRACT

This invention is generally directed to minimizing the disruption of subscriber selectable features during the transfer of subscriber lines from a first line unit equipment to a second line unit equipment associated with a telecommunications switch. A second data assignment table which is based on a first data assignment table is utilized in conjunction with a digital telecommunications switch to facilitate an improved service transition when subscriber lines are to be transferred from a first type of line unit equipment to a second type of line unit equipment. The data assignment tables contain for each telephone number an identification of a line unit address utilized to support that telephone number and corresponding parameters which identify which customer selectable features are active. The second data table duplicates the parameter defining features in existence in the first table as of the time of creation of the second table, but substitutes different line unit addresses corresponding to the new line unit equipment for each telephone number to be supported. Upon a physical transition to the new equipment, the second data table is activated so that upon a resumption of service customers will have access to previously defined features as defined in the second table.

14 Claims, 4 Drawing Sheets

FIG. 4
(PRIOR ART)

| FIRST DATA ASSIGNMENT TABLE ||||||| |
|---|---|---|---|---|---|---|
| TEL NO. | LU NO. | PORT STATUS | FEATURES ||||
| #1 | 1310 | | ✓ | | ... | |
| #2 | 1311 | | | ✓ | ... | ✓ |
| ⋮ |||||||
| | | | | | ... | |

FIG. 5

| SECOND DATA ASSIGNMENT TABLE ||||||| |
|---|---|---|---|---|---|---|
| TEL NO. | DCLU NO. | STATUS | FEATURES ||||
| #1 | 2407 | | ✓ | | ... | |
| #2 | 2408 | | | ✓ | ... | ✓ |
| ⋮ |||||||
| | | | | | ... | |

INTRASWITCH TRANSITION TO NEW LINE SUPPORT EQUIPMENT

BACKGROUND OF THE INVENTION

This invention addresses service disruptions in a telecommunications switch when subscriber lines are transferred (cutover) from existing line support equipment to different line support equipment. More specifically, the invention minimizes the disruption of subscriber selectable features during the transfer of line support equipment.

The transfer of equipment providing service to subscriber lines typically occurs in two ways: a set of subscriber lines being served by an existing switch may be desired to be transferred to a new switch; or a set of subscriber lines which is served by a switch with existing line unit equipment is desired to be transferred so that the same set of subscriber lines will be served by different line support equipment associated with the same switch. Where a new switch is to replace an existing switch, conventional analog subscriber lines are temporarily connected in parallel to both switches. The connections between the subscriber lines and the two switches are normally verified line by line to minimize the possibility of service interruptions when the service transition is made from the old switch to the new switch. The line by line verification is utilized to confirm that the same telephone number in both the old and new switch accesses the same subscriber line.

Such known test methods involving parallel connections to a subscriber line are not suitable for testing subscriber lines served by digital subscriber loop carrier facilities, such as the AT&T SLC® systems. A method for the pre-cutover verification of subscriber lines served by digital carrier facilities involving a transition from an existing switch to a new switch is discussed in U.S. Pat. No. 4,653,043. When a transition of service for a set of subscriber lines from an existing switch to a new switch is required, the availability of two independently controllable switches provides flexibility with regard to implementing the transition.

Digital switches, such as the AT&T 5ESS® switch, are capable of supporting conventional analog subscriber lines through analog line unit equipment and are also capable of supporting subscriber lines via a multiplexed digital carrier line unit wherein communications with subscriber lines are provided by digital signaling within multiplexed time slots. A remote terminal, which includes multiplexing, A/D, and D/A functions, is used as an interface between the digital signaling carried by a multiplexed communications line and analog subscriber lines. Transition difficulties exist when subscriber lines are transferred from analog line units associated with the digital switch to digital carrier line units associated with the same digital switch. One approach utilized for such a transition is to permit telephone numbers to remain associated with the subscriber lines coupled to the switch through existing analog line unit equipment and assign new telephone numbers for the same subscriber lines when service is transferred to the digital carrier line units. However, the assignment of new telephone numbers for subscribers is undesirable from a telephone customer perspective.

An alternative transition on the same digital switch from line unit equipment to digital carrier line unit equipment is to make a flash cut, i.e., simultaneous physical disconnection, of the line unit supported lines. A multiplexed T1 line is connected as quickly as possible between the digital carrier line unit equipment and a remote terminal which services the subscribers. This technique results in the subscribers losing the ability to use previously programmed customer selectable features until a substantial time period following the restoration of service. The data table which stored the selectable features must be updated following the cutover.

Thus, there exists a need for an improved method for making a service transition of existing subscriber lines from one type of line support equipment to a different type of line support equipment associated with the same telecommunication switch, such as from analog line unit equipment to digital carder line unit equipment.

SUMMARY OF THE INVENTION

It is an object of the present invention to minimize service disruptions when subscriber lines are transferred from one type of line equipment support to another type of line equipment support at the same switch.

A further object of the present invention is to make customer selectable features accessible immediately following a transition of service from one type of line support equipment to another type of line support equipment associated with the same switch.

In an embodiment of the present invention, a digital switch such as an AT&T 5ESS switch, includes line unit (LU) equipment for supporting conventional analog wire subscriber lines and digital carrier line unit (DCLU) equipment for supporting a plurality of subscribers over a multiplexed line, such as a conventional T1 line. It is desired to transfer the existing subscriber lines supported by the LU equipment to the DCLU. A first data table exists in the switch that correlates the telephone numbers associated with subscriber lines to the individual ports associated with the LU equipment. The first data table also contains the activation states of customer selectable features associated with each telephone number.

In accordance with the present invention, a second data table is created and stored in the switch, and identifies which of the DCLU ports will correspond to each existing telephone number, i.e., subscriber line. Additional parameters stored in the first data table such as the activation states of customer selectable features are duplicated in the second data table for each telephone number so that the same features will be available when the second data table is activated and the first data table deactivated. Although the second data table is created prior to a cutover, the second data table is not made active until just after cutover. Thus, the first data table continues to control the routing of calls until the physical line cutover.

Upon cutover, the second data table is activated and the first data table deactivated. As soon as the physical cable transition can be made, the subscribers will regain service using the same telephone numbers. The subscribers will have access to custom selectable features that existed as of the time of creation of the second data table. Shortly after the physical line cutover, the second data table is updated to include any subscriber selectable feature changes made in the first data table after the creation of the second data table. Utilizing this technique, subscriber outages following a cutover can be limited to only a few minutes per line. Also, all subscriber selectable features which were defined when the second data table was created will be immediately available upon service restoration after cutover.

BRIEF DESCRIPTION OF THE DRAWINGS

FIG. 4 illustrates a first data table used by the switch in which telephone numbers, line equipment port addresses, and other features corresponding to each telephone number are stored.

FIG. 5 illustrates a second data table used by the switch in accordance with the present invention.

DETAILED DESCRIPTION

Figure 1:
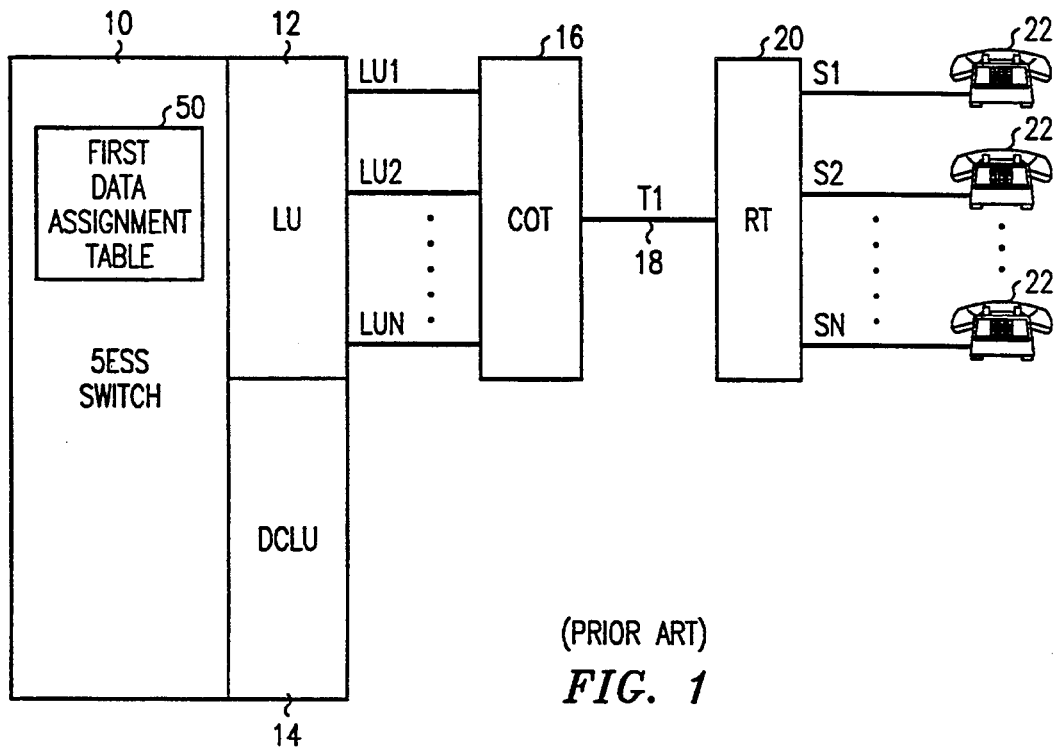
FIG. 1 is a block diagram of a switching system illustrating subscribers served by line unit equipment at a digital switch.

FIG. 1 illustrates a block diagram of a prior art switching system having a digital switch 10, such as an AT&T 5ESS switch, which includes LU equipment 12, DCLU equipment 14, and a first data assignment table 50. The LU equipment 12 supports analog lines LU1 through LUN which correspond to subscriber lines S1 through SN. A central office terminal (COT) 16 acts as an interface between the LU lines and a T1 multiplexed line 18 which carries the information on the LU lines as digital signals contained in time slots corresponding to each LU line. A remote terminal (RT) 20 serves a similar function to COT 16 in that it provides a translation between the multiplexed information contained on multiplexed line 18 and the individual subscriber lines S 1 through SN. Customer premises equipment (CPE) 22, such as telephones, are supported by the subscriber lines.

A recognized advantage of utilizing an intermediate multiplexed line 18 supported by COT 16 and RT 20 is the minimized cost associated with maintaining a plurality of copper lines extending from the site of COT 16 which is typically located at or near a central office and the RT which is typically located at a remote central distribution site proximate to the corresponding subscriber lines S1-SN. The switch 10 includes the first data assignment table 50 in which telephone numbers assigned to the different CPE 22 have an assigned correspondence to different LU port addresses to which the LU lines are coupled. This data table and its utilization are described in greater detail below.

Figure 2:
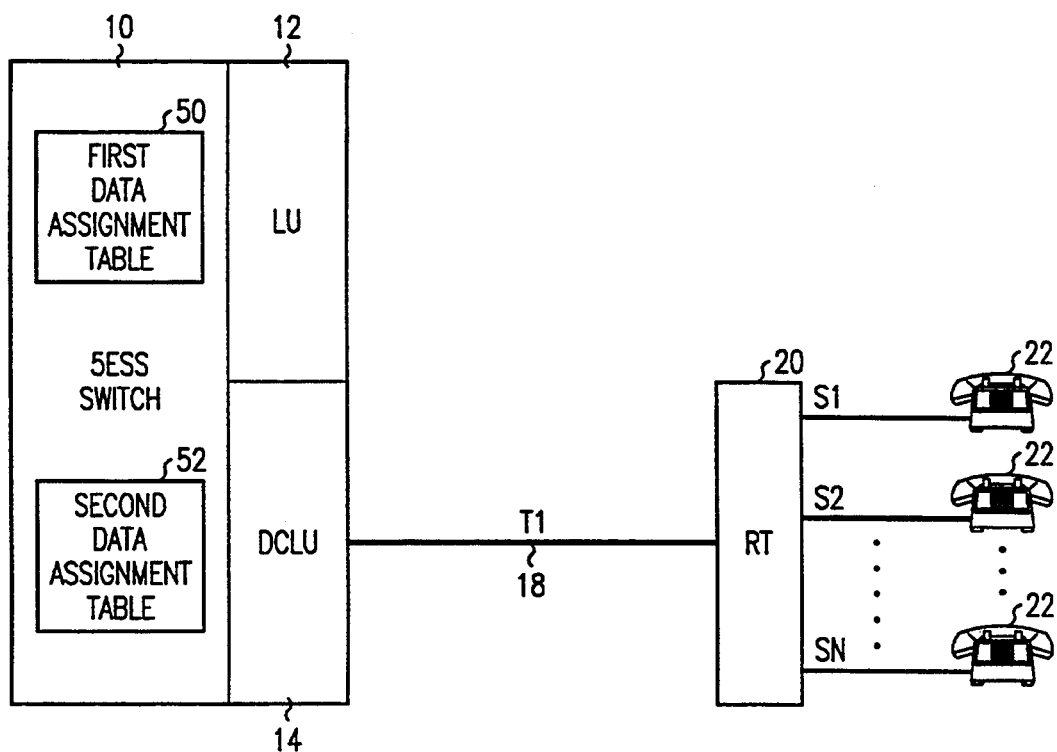
FIG. 2 is a block diagram of a switching system in accord with the present invention in which subscribers are served by a multiplexed T1 line coupled to a digital switch by digital carrier line unit equipment.

FIG. 2 is a block diagram of a switching system similar to that shown in FIG. 1 except that multiplexed T1 line 18 is terminated directly by DCLU equipment 14 associated with switch 10 and a second data assignment table 52 is utilized to facilitate a service transfer. It will be apparent that this eliminates the need for a COT and the utilization of multiple LU lines which would have been required to connect a COT to LU equipment 12. Since the DCLU equipment 14 provides a direct multiplexed interface to multiplexed line 18, efficiencies can be achieved as will be observed by contrasting FIG. 2 with FIG. 1.

The conversion of a switching system as shown in FIG. 1 to that as shown in FIG. 2 requires the physical disconnection of multiplexed line 18 from COT 16 and its reconnection to DCLU equipment 14. The second data assignment table 52, described in detail below, facilitates a service cutover so that the LU port addresses which corresponded to subscriber telephone numbers in table 50 are changed to corresponding DCLU port addresses associated with appropriate time slots which correspond to the same subscriber lines and telephone numbers in table 52.

Figure 3:
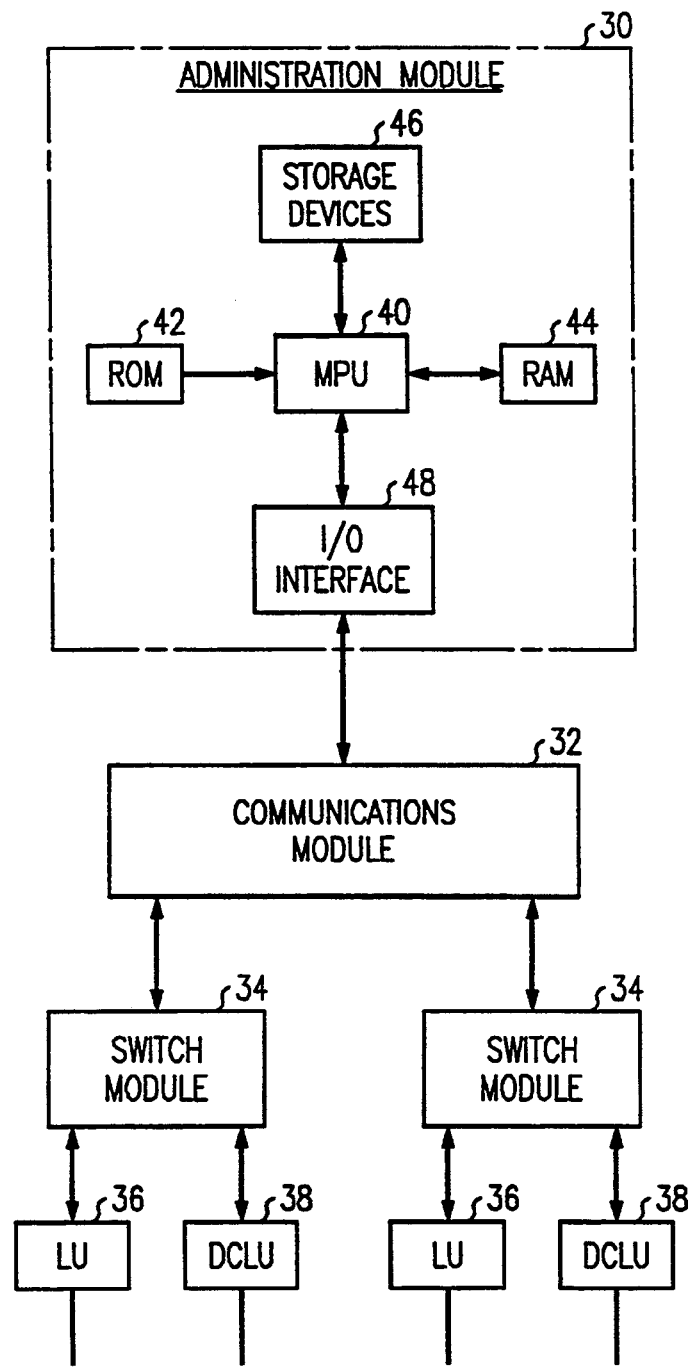
FIG. 3 is a block diagram of an exemplary telecommunications switch utilized in conjunction with the present invention.

FIG. 3 is a block diagram of a prior art structure of digital switch 10 of FIGS. 1 and 2. The switch includes an administration module 30 which provides administration, maintenance, and control functions for the switch. Administration module 30 interfaces with a communications module 32 which controls communications and routing between switch modules 34. The switch modules are coupled to LU equipment 36 and DCLU equipment 38.

The administration module 30 consists of a microcomputer processing means that includes a microprocessor (MPU) module 40 which is coupled to read-only memory (ROM) 42 and random access memory (RAM) 44. Storage devices 46 such as disk drives are also coupled to MPU 40. The switch is controlled in accordance with software routines stored in storage devices 46, ROM 42, and RAM 44. The MPU 40 interfaces with an input/output interface 48 which provides a communication link to the remainder of the switch via communications module 32.

FIG. 4 illustrates a first data assignment table 50 which is incorporated in a storage element as part of the administration module 30 of switch 10. This table provides a visual reference illustrating data stored in the switch which defines parameters utilized for each telephone number. Parameters assigned for each telephone number include a line unit number, port status, and the activation state of customer selectable features. The line unit number identifies the port address of the line unit equipment associated with the corresponding telephone number. In the switching system as shown in FIG. 1, the line unit number would identify one of the line unit lines LU1-LUN; in the switching system as shown in FIG. 2, the DCLU number corresponds to the particular time slot associated with DCLU 14 and multiplexed T1 line 18 which will carry the communications associated with the telephone number. The port status parameter indicates the status of the port, such as active, disabled, etc., dependent upon the particular switch utilized. The customer selectable feature parameters include a series of flags utilized to identify if a corresponding feature is active for each telephone number. For example, these features may include speed calling, call forwarding, call waiting, and 3-party conferencing. Because these customer selectable features can be changed at the discretion of the subscriber, these parameters may vary on a relatively frequent basis.

FIG. 5 illustrates a second data assignment table 52 utilized in accordance with the present invention in a switch to facilitate a less disruptive service transition from one type of line unit equipment to another type of line unit equipment. The second data assignment table 52 is created in the switch based on a first data table 50 a short time period, such as a few days, prior to a scheduled cutover to different line unit equipment. The second data assignment table 52 constitutes a substantial duplicate of the first data assignment table 50 except that DCLU port numbers associated with each of the existing telephone numbers are assigned in place of the previously assigned LU numbers in table 50. For example, LU number 1310 associated with telephone number #1 in table 50 is translated so that DCLU number 2407 corresponds to telephone number #1 in table 52. Assuming a service transition from LU equipment 12 (FIG. 1) to DCLU equipment 14 (FIG. 2), the DCLU number in table 52 corresponds to the port address that identifies a particular time slot assignment utilized to carry communications on multiplexed T1 line 18 for a particular telephone number; the previously assigned LU address in table 50 corresponded to one of the LU lines LU1–LUN. The remainder of the parameters for telephone numbers in table 52 will be the same as for corresponding telephone numbers as indicated in table 50. Thus, the customer selectable features at the time of the creation of table 52 are transferred as they existed for each telephone number in table 50.

Although table 52 is created prior to the physical cutover, it remains inactive, i.e., it is not utilized to direct (route) telephone calls, until after the physical cutover. The first table 50 remains active and is subject to changes during the interval from the creation of table 52 until the physical cutover. It is desirable that table 52 not be created too far in advance of the scheduled physical cutover to minimize any differences between subscriber selectable features in table 50 and table 52. The transition from utilizing table 50 to table 52 must be coordinated with the timing of the physical cutover so that table 52 becomes active substantially concurrent with the physical cutover. Upon activating table 52, table 50 is deactivated but not immediately destroyed. Following the physical cutover and the resumption of service, a subscriber will have access to the same custom selectable features as was defined at the creation of table 52. Thus, except for any recent changes in selectable features entered after the creation of table 52, subscribers should not be substantially impacted following the transition.

Within a few days following the physical cutover, a comparison is made between corresponding features for the same telephone numbers in table 52 and 50 to determine if any differences exist. If differences do exist, the features corresponding to telephone numbers in table 52 are updated to include those features as defined for the corresponding telephone numbers in table 50 as of the deactivation of table 50. This comparison and updating of table 52 thus picks up any changes that may have been made during the interval between the creation of table 52 and its activation. Following the updating of table 52, the original first data assignment table is no longer needed and the storage space utilized to store the first data table may be released for other storage needs.

Figure 6:
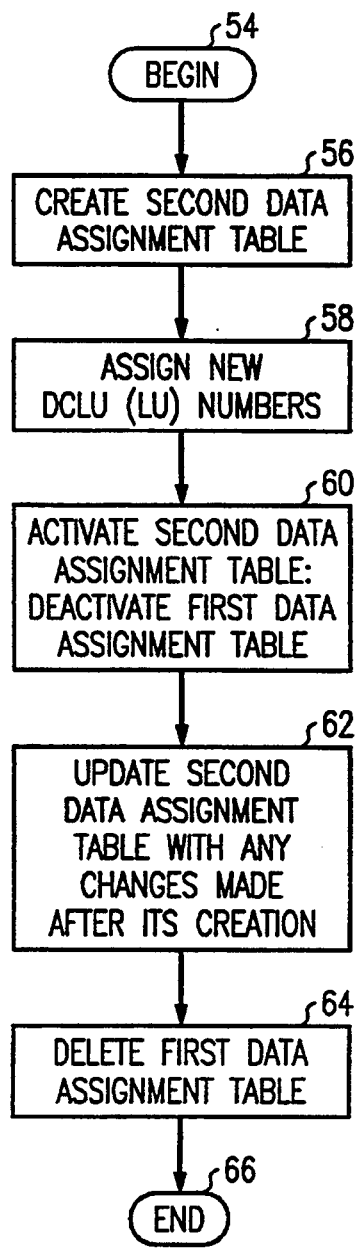
FIG. 6 is a flow diagram illustrating steps in accordance with an embodiment of the present invention to effectuate an improved cutover from first to second line unit equipment associated with a digital switch.

FIG. 6 illustrates a flow diagram of exemplary steps utilized in a method in accordance with the present invention to make a service transition to different line unit equipment. The administration module 30 contains a microcomputer processing means suited for implementing these steps. The method starts at BEGIN entry step 54. In step 56 a second data assignment table is created based on the first data assignment table and may be initiated by creating a duplicate of the first table. This step preferably occurs not more than a few days before the scheduled physical cutover transition. New DCLU numbers associated with the new DCLU equipment are assigned for each telephone number in the second table in step 58 and substituted in place of LU numbers contained in the copy of the first table. This assignment process may utilize an automatic assignment of new DCLU port numbers based on a predetermined relationship to the previously assigned port numbers in the first table or may be manually assigned by a person at a central office in accordance with an assignment plan. Step 58 must be completed prior to the physical cutover. In step 60 the second table is activated and the first table is deactivated. This step preferably occurs substantially concurrent with the physical cutover so that the second table is utilized to provide initial service following the service outage that occurs during the physical cutover transition. This correlation can be managed by coordinating personnel responsible for the physical cutover with personnel that control the timing of the software transition from the first to second table. Within a few days following the physical cutover, the second table is updated in step 62 with any changes of subscriber selectable features which may have been made in the first table after the creation of the second table. Customer selectable features which are made after the creation of the second table but before activation of the second table are reflected in the first table. In step 64 the first data table is deleted since a complete transition has been made and it will no longer be utilized. This frees up additional memory storage space for other needs. The process is concluded at END step 66.

The exemplary embodiment of the present invention is described as converting from an analog LU to a DCLU, but the advantage may be enjoyed if converting from one analog LU to another, or from a DCLU to another, or from one type of interface to another. Whatever the conversion, use of the present invention minimizes the duration of a service disruption when a telecommunications switch is reconnected from existing line unit equipment to different line unit equipment. Customer selectable features, as existed at the time of creation of the second table, are immediately available for use following the cutover.

Although an embodiment of the present invention has been described and shown in the drawings, the scope of the invention is defined by the claims which follow.

We claim:

1. A method for transferring service provided to subscriber lines by one set of line unit equipment coupled to a digital telecommunications switch to another set of line unit equipment coupled to said switch, said switch having a first data assignment table that includes a list of subscriber telephone numbers and, for each telephone number, the identity of a line unit port associated with said one set of line unit equipment and the states of subscriber selectable features associated with each of said telephone numbers, the method comprising the steps of:
   (a) creating a second data assignment table in said switch based on said first data assignment table wherein said telephone numbers and states of corresponding subscriber selectable features contained in said first table are stored in said second table;
   (b) assigning in said second table a line unit port identification of one of said another set of line unit equipment for each telephone number;
   (c) following steps (a) and (b), activating said second table and deactivating said first table to transfer said service, said active second table causing said subscriber lines to be serviced via said another set of line unit equipment.

2. The method according to claim 1 further comprising, following step (c), the step of updating the states of said subscriber selectable features contained in said second table by including changes of said states in said first table which occurred after step (a).

3. The method according to claim 1 further comprising the steps of disconnecting a communication line coupling said subscriber lines to said one set of line unit equipment and connecting said communication line to said another set of line unit equipment.

4. The method according to claim 3 wherein said disconnecting and connecting steps are performed after steps (a) and (b).

5. In a digital telecommunications switch having one set of line unit equipment coupled to subscriber lines, another set of line unit equipment capable of providing service to said subscriber lines, and means for storing a first data assignment table that includes a list of subscriber telephone numbers and, for each telephone number, the identity of a line unit port associated with said one set of line unit equipment and the states of subscriber selectable features associated with each of said telephone numbers, the improvement in transferring subscriber line service from said one set to said another set of line unit equipment comprising:

means for storing a second data assignment table in said switch based on said first data assignment table wherein said telephone numbers and states of corresponding subscriber selectable features contained in said first table are stored in said second table and wherein line unit port identifications of said another set of line unit equipment are assigned for each telephone number;

microcomputer processing means operating under control of a program for activating said second table and deactivating said first table to transfer said service, said active second table causing said subscriber lines to be serviced via said another set of line unit equipment.

6. The switch according to claim 5 further comprising a microcomputer processing means operating under control of a program for updating the states of said subscriber selectable features contained in said second table as existed at the creation of said second table based on states of features of corresponding telephone numbers contained in said first data table.

7. The switch according to claim 5 wherein said another set of line unit equipment is adapted for communication with said subscriber lines via a multiplexed communication line.

8. The switch according to claim 7 wherein said microcomputer processing means for activating said second table activates said second table concurrent with said communication line being coupled to said another set of line unit equipment.

9. A method for transferring service provided to subscriber lines by one set of line unit equipment coupled to a digital telecommunications switch to another set of line unit equipment coupled to said switch, selectable hardware and features associated with subscriber telephone numbers in said switch, the method comprising the steps of:

(a) creating and storing in said switch a first data table that includes said subscriber telephone numbers and, for each telephone number, a first set of parameters that define which of said hardware and features are to be used for each telephone number;

(b) utilizing said parameters in said first data table to control said features available for said telephone numbers;

(c) creating and storing in said switch a second data table that includes for each of said telephone numbers a second set of parameters that define which of said hardware and features are to be used for each telephone number;

(d) activating said second data table and deactivating said first data table whereby parameters defined in said second data table control features available for said telephone numbers.

10. The method according to claim 9 wherein said selectable hardware includes first and second line unit equipment, said activating and deactivating steps controlling which of said first and second line unit equipment will be used for each subscriber telephone number.

11. The method according to claim 1 wherein said one set of line unit equipment uses analog line signaling and said another set of line unit equipment uses digital signaling.

12. The switch according to claim 5 further comprising microcomputer processing means operating under control of a program for creating said second data assignment table based on said first table.

13. The switch according to claim 5 wherein said one set of line unit equipment supports analog signaling and said another set of line unit equipment supports digital signaling.

14. The method according to claim 10 wherein said first and second line unit equipment support analog and digital signaling, respectively.

* * * * *